United States Patent [19]

Handte

[11] Patent Number: 4,918,612

[45] Date of Patent: Apr. 17, 1990

[54] ELECTRONIC DEVICE FOR CONTROLLING THE TOOL POSITION OF A MACHINE TOOL

[75] Inventor: Herbert Handte, Filderstadt, Fed. Rep. of Germany

[73] Assignee: Moog GmbH, Fed. Rep. of Germany

[21] Appl. No.: 152,133

[22] Filed: Feb. 4, 1988

[51] Int. Cl.$^4$ .............................................. G06F 15/46
[52] U.S. Cl. ............................... 364/474.22; 364/188; 364/473
[58] Field of Search ...................... 364/474.22–474.27, 364/188, 189, 473, 476, 191–193, 474.3

[56] References Cited

U.S. PATENT DOCUMENTS

| | | | |
|---|---|---|---|
| 4,008,461 | 2/1977 | Raven | 364/900 |
| 4,555,610 | 11/1985 | Polad et al. | 364/474.22 X |
| 4,674,053 | 6/1987 | Bannai et al. | 364/188 X |
| 4,685,064 | 8/1987 | Kinoshita et al. | 364/474.22 X |
| 4,723,207 | 2/1988 | Isobe et al. | 364/474.22 X |
| 4,794,514 | 12/1988 | Hideaki et al. | 364/474.22 |

FOREIGN PATENT DOCUMENTS 3232645 4/1983 Fed. Rep. of Germany .
2140730 12/1984 United Kingdom .

*Primary Examiner*—Joseph Ruggiero
*Attorney, Agent, or Firm*—Arnold, White & Durkee

[57] ABSTRACT

An apparatus for controlling the tool position in a machine tool, permitting position data and adjustment speed data to be altered without the operator having to consider the actual value of such data. The apparatus comprises an alteration memory adapted to have alteration data in the form of absolute values or percentages entered thereinto and to hold such data available for a subsequent calculation process involving the data relating to the tool position or adjustment speed, respectively.

The calculation is automatically carried out with the aid of gating means within the apparatus. Alternatively possible is an overwriting of data with values entered without calculation.

3 Claims, 2 Drawing Sheets

ELECTRONIC DEVICE FOR CONTROLLING THE TOOL POSITION OF A MACHINE TOOL

BACKGROUND OF THE INVENTION

The invention relates to apparatus for controlling the tool position of a machine tool, comprising data memory means for storing tool position data in a given sequence and tool adjustment speed data, means for entering said tool position data and tool adjustment speed data into said data memory means, means for retrieving said data for controlling the tool movement to positions determined by said tool position data with adjustment speed determined by said tool adjustment speed data, display means for the visual display of the entered position data and adjustment speed data, and means for marking selected ones of said position data and adjustment speed data displayed on said display means, and at the same time of the associated storage position in said data memory means.

In modern machine tool control devices used for instance in plastic processing machines such as blow molding machines, injection molding machines and the like, the process parameters are entered and issued with the aid of a keyboard and a visual display, respectively. The visual display may comprise a viewing screen or, in a simplified form, an LED line display, a liquid crystal line display of the like. The process parameters, that is, data corresponding to the positions to be assumed by the tool during the process, and data relating to the adjustment speeds at which the tool is to be adjusted between the individual given positions, are entered by an operator via the keyboard and displayed on the display device in tablular form for instance. If a parameter is to be altered, the respective parameter can be selected by entering the associated serial number or by positioning a marker at the respective data, which goes together with the marking of the associated storage position in the memory means. The selected parameter may then be overwritten by entering new data by means of the keyboard.

In many processes, for instance in the plastic processing industry, there are numerous parameters which cannot be accurately predicted, for instance by calculation. These parameters rather have to be determined by extensive trials, to which purpose they are initially altered by way of approximation, and subsequently altered in the course of the process until the optimum value is found. This is frequently accomplished by applying empirical values for altering the selected parameter either by an absolute amount or by a determined fraction of its actual value. This requires the selected actual parameter to be read out, however, and to be re-entered after its altered value has been calculated on the base of its actual value. This is a time-consuming and cumbersome operation and a possible source of errors.

In practice it is therefore customary to do without this calculation and to estimate and re-enter the altered value of the selected parameter. This estimating procedure gives frequently reason, however, for numerous futile trials. In addition, this estimating method is also time-consuming, because the estimated altered value of the parameter has to be entered at full length, which may require the operation of a great number of keys on the keyboard.

SUMMARY AND OBJECTS OF THE INVENTION

It is therefore an object of the invention to provide apparatus of the type defined in the introduction which permits the value of a selected one of the stored tool position or tool adjustment speed data to be rapidly altered in a simplified manner.

This object is attained by the characterizing features of claim 1. Advantageous aspects of embodiments of the invention are the subject matter of the sub-claims.

Broadly speaking, the invention relates to an apparatus for controlling the tool position of a machine tool, comprising data memory means for storing tool position data in a given sequence and tool adjustment speed data, means for entering of said tool position data and tool adjustment speed data into said data memory means, means for retrieving said data for controlling the tool movement to tool positions determined by said tool position data with adjustment speeds determined by said tool adjustment speed data, display means for the visual display of the entered position data and adjustment speed data, and means for marking selected ones of the displayed position data and adjustment speed data on said display means, and at the same time of the associated storage position in said data memory means.

The apparatus further comprises alteration memory means connected to said entering means (3) for receiving alteration data for altering position data and/or adjustment speed data, gating means connected to said alteration memory means and to said data memory means, order entering means for selectively entering one of the orders "percental alteration", "absolute alteration" and "overwrite with altered value" into said gating means, and computer means controlled by said gating means for altering at least the marked data in the marked storage position, or for overwriting such marked data with the entered value, in accordance with the entered order.

The invention permits the value of one of the control parameters (tool position data, tool adjustment data) to be altered without the operator having to consider the actual value of the respective parameter. The operator simply enters either an absolute alteration value, together with the order to add this value to the actual value or to subtract it therefrom, or he enters a percental value together with the appropriate order to add the entered percental value to the actual value or to subtract it therefrom. The apparatus will then automatically carry out the required calculation on the base of the actual value of the selected parameter and write the calculated altered value into the storage position designated by the market. It is also possible, however, to enter an altered value of a selected parameter directly, i.e., to do without the calculation capability of the apparatus. The apparatus according to the invention saves time and reduces errors by permitting the optimum parameter value to be found more rapidly to thereby avoid the excessive production of substandard goods.

To this purpose the apparatus may advantageously include rounding means for automatically rounding the altered parameter up or down.

BRIEF DESCRIPTION OF THE DRAWINGS

An embodiment of the invention shall now be described by way of example with reference to the accompanying drawings, wherein.

DESCRIPTION OF THE PREFERRED EMBODIMENTS

Figure 1:
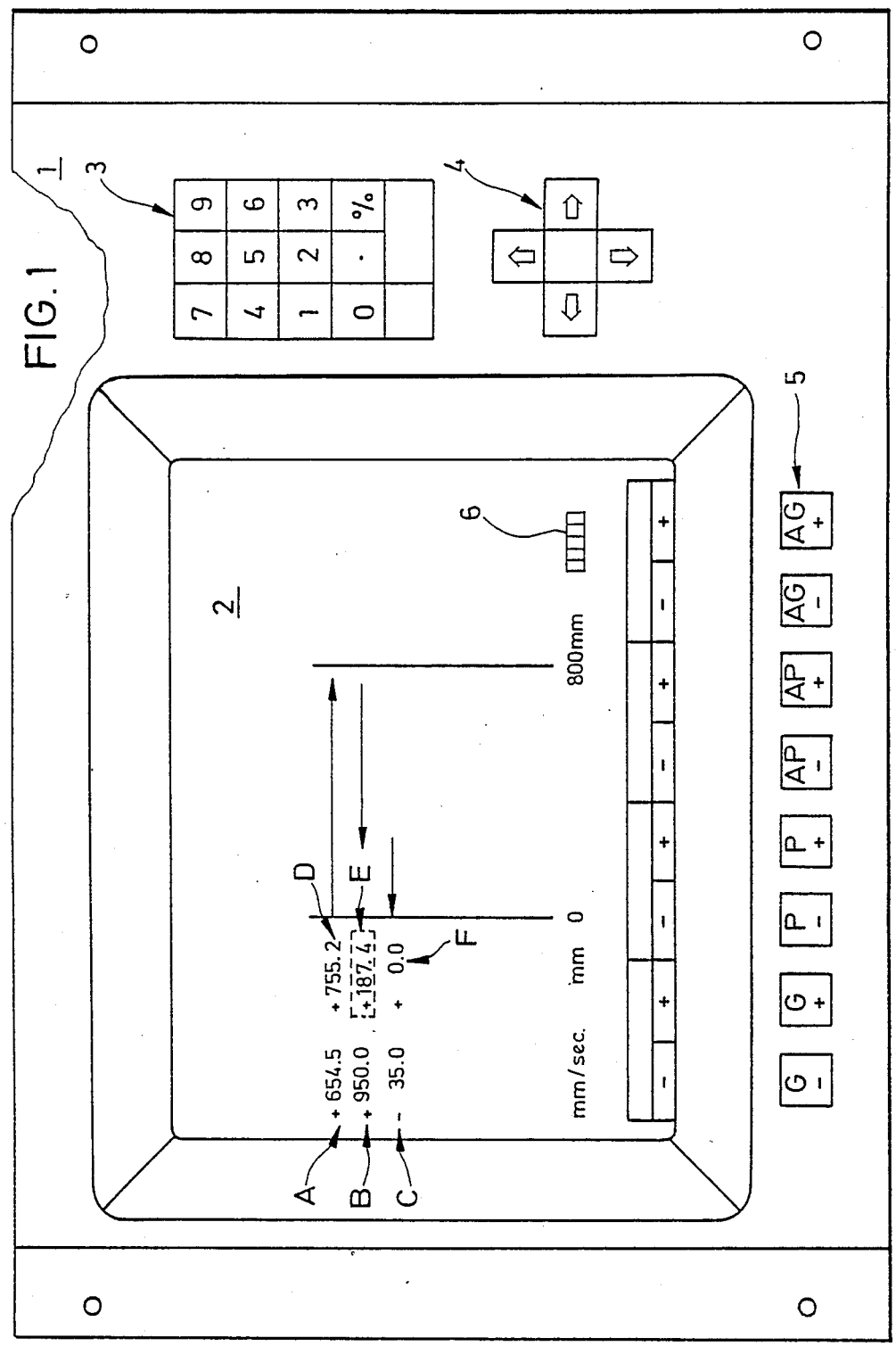
FIG. 1 shows an operating panel of the control apparatus according to the invention.

Shown in FIG. 1 is an operating panel of the control apparatus, comprising display means in the form of a viewing screen 2, a numeric keyboard 3 having ten digit keys, a comma key, a percent key, an eraser key "CLEAR" and an input key "ENTER". Also shown is a cursor keyboard 4 for the displacement of a cursor on screen 2 as indicated by the symbols on the keys of cursor keyboard 4. Disposed below viewing screen 2 is a function keyboard 5 consisting in the present example of eight keys associated to different functions displayed on screen 2 as "speed −", "speed +", "position −", "position +", "all positions −", "all positions +", "all speeds −" and "all speeds +". For better understanding the associated keys of function keyboard 5 are marked "G −", "G +", "P −", "P +", "AP −", "AP +", "AG −" and "AG +".

Viewing screen 2 has a display area 6 for displaying the data entered by means of numeric keyboard 3, which may be in the form of percentage data.

Figure 2:
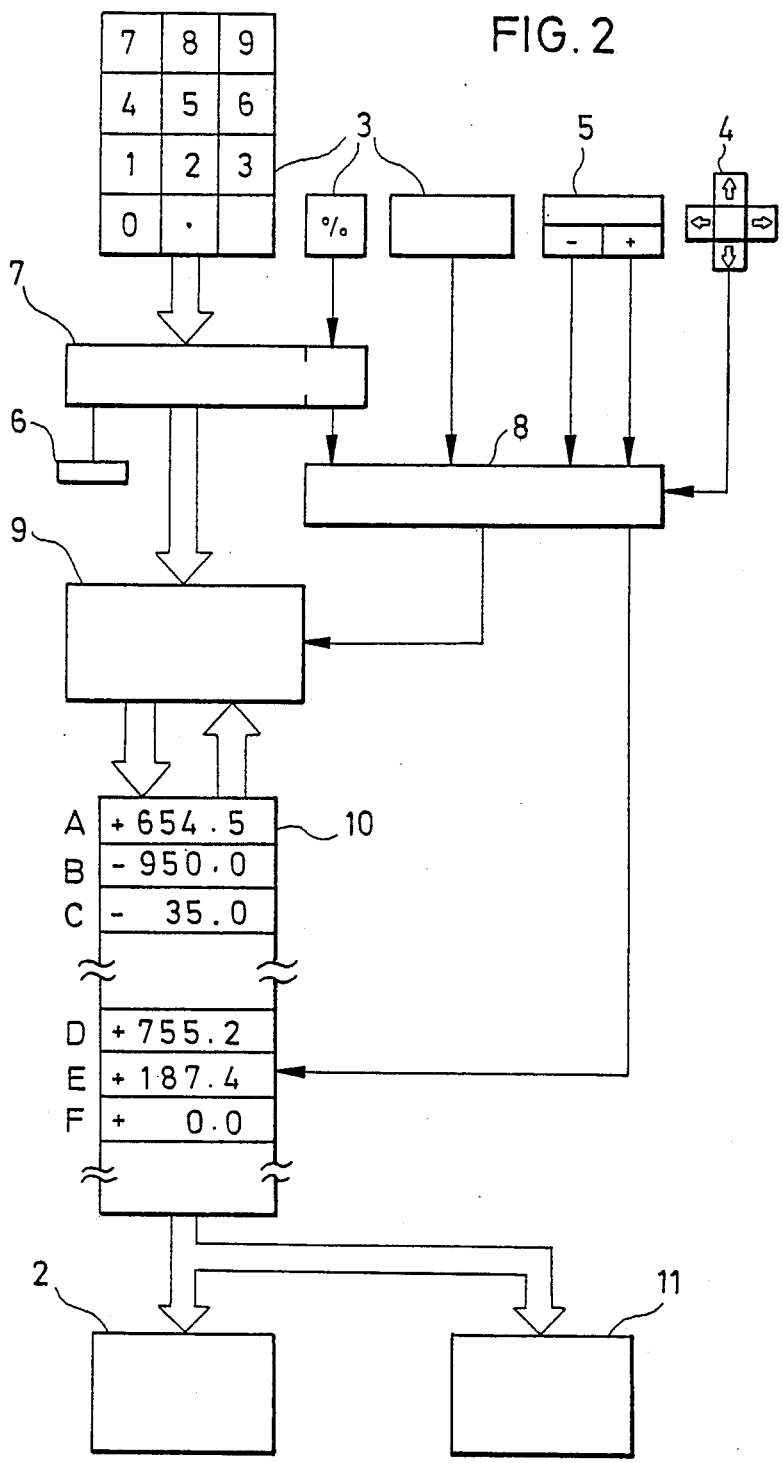
FIG. 2 shows a block diagram of the control apparatus.

FIG. 2 shows a block diagram of the control apparatus according to the invention. As shown in this figure, numeric keyboard 3 is connected to an alteration data memory 7. Also shown is a gating component 8 having input terminals for data supplied by the alteration data memory, numeric keyboard 3, cursor keyboard 4 and function keyboard 5. The arrangement further includes a computer device 9 supplied by alteration data memory 7 with numeric alteration data, and by gating component 8 with process orders indicative of the kind of alterations to be carried out with the data supplied by alteration data memory 7. Computer device 9 is connected to a data memory 10 storing the data relating to speed and position as displayed on the viewing screen, for exchange of data therebetween. Data memory 10 is controlled by gating component 8 for addressing or marking, respectively, a selected storage position.

Data memory 10 is also connected to viewing screen 2 and to a tool adjustment unit 11. Display area 6 has the informations to be displayed supplied thereto from alteration data memory 7.

The above described arrangement operates as follows:

Under the control of the control apparatus, viewing screen 2 is operable to display adjustment speeds, some of which are indicated by way of example at A, B, C, and tool positions, indicated by way of example at D, E and F. Also displayed in graphic form on viewing screen 2 to the right of the above denoted parameters A to F are displacement paths, and again to the right thereof there is an indication of the operation performed by the tool, in the present example a blow mold for blowing bags of a tubular plastic material.

The parameters A to F represented in the drawings have initially been entered into data memory 10 by means of numeric keyboard 3. In the example shown, cursor keyboard 4 has been operated to displace the cursor o a position adjacent parameter E as indicated by dotted lines on viewing screen 2.

If for example the thus marked parameter E is to have its indicated value of 187.4 mm altered to for instance 234.6 mm, the respective keys of cursor keyboard are initially operated to adjust the cursor to the location of parameter E as depicted for the present case. This results in the associated storage position in data memory 10 to be addressed concurrently therewith. Subsequently keys "2", "3", "4", "," and "6" of numeric keyboard 3 are depressed, the respective digits being displayed on display area 6. Depression of input key "ENTER" then causes the thus selected value 234,6 to be entered into data memory 10 at the storage position of parameter E, the results being displayed on viewing screen 2. This operation is comparable to the customary entering operation in conventional control devices.

If in contrast thereto the displayed value of for instance parameter D=755,2 mm is to be reduced by 1/10, i.e 10% the operator has to depress the keys "1", "0" and "%" of numeric keyboard 3. As a result, the value "10%" appears on viewing screen 2 at lower right of display area 6. Cursor keyboard 4 is operated to displace the cursor to the position corresponding to parameter D. Subsequently, function key "P−" is depressed.

Computer device 9 then performs a calculation for subtracting 10% from the original value of parameter D retrieved from data memory 10. The thus calculated value of 679.68 mm is automatically rounded to 679.7. This rounded value is entered into data memory 10 at the storage position for parameter D, and at the same time displayed at the corresponding location on viewing screen 2.

If subsequently a further parameter is to be altered again by 10%, cursor keyboard 4 has to be operated to displace the cursor to the corresponding location on viewing screen 2, for instance to the location of parameter E. Depression of function key "P−" (if the value is to be reduced by 10%) then causes the same calculation to be carried out with respect to parameter E, the calculated value of 168.66 mm being rounded to 168.7. This value is then entered into data memory 10 at the storage position of parameter E, and is at the same time displayed on viewing screen 2.

If on the other hand the value of a position parameter is to be increased by 10%, the cursor is adjusted to the respective parameter, whereupon function key "P+" is operated for raising the respective value by 10%. There is thus no need for entering the percentage value anew when several parameters are to be altered by the same percentage, irrespective of whether their values are to be increased or decreased.

The speed parameters A, B and C can be altered in a similar manner by depressing function keys "G−" or "G+" in this case.

If the value of a parameter is to be raised not by a percentage, but to 108% for instance, the operator has to depress keys "1", "0", "8" and "%" of numeric keyboard 3, whereupon the number "108%" appears on display area 6. After the cursor has subsequently been positioned at the location of the selected parameter, input key "ENTER" of numeric keyboard is depressed for causing the value of the selected parameter to be calculated anew on the base of the former value.

The invention also permits alterations by absolute values to be carried out without the operator having to consider the actual value of the selected parameter to this purpose.

If for instance parameter E is to be increased by 25 mm, the procedure is the following. Keys "2" and "5" of numeric keyboard 3 are depressed, whereupon "25" appears on display area 6. Subsequently the cursor is positioned at the location of the selected parameter E. Depression of function key "P+" then causes computer device 9 to carry out a calculation adding the entered value of 25 mm to the previously valid value of 187.4 mm. The thus calculated result 212.4 mm is then entered into data memory 10 at the storage position of parameter E, and is at the same time displayed on viewing screen 2.

It is to be specifically noted that the sequence regarding the entering of the alteration values and the positioning of the cursor may also be reversed, i.e. the cursor may initially be positioned at the location of the selected parameter before the alteration data are entered.

If a parameter has been altered by entering an alteration value in the form of an absolute value, the alteration may be cancelled by depressing the reciprocal function key on function keyboard 5. Thus if at first key "P+" has been operated, depression of key "P−" will cause the alteration to be cancelled.

The same principle applies with regard to alterations of speed parameters A to C, in which case function keys "G−" and "G+" have to operated, respectively.

If any group of parameters, for instance all tool position parameters, are to altered by the same value or by the same percentage, the cursor needs not be positioned at any specific parameter location. After the alteration value or the alteration percentage, respectively, has been entered, all that remains to be done is to depress function key "AP−" (in the case of reducing the parameters) or the key "AP+" (in the case of increasing the parameters. After depression of the respective function key, the calculations for all of the thus selected parameters are automatically carried out by the control apparatus.

The invention is of course not restricted to the control of plastic-processing machines such as blow molding machines or injection molding machines. These applications have only been named by way of example. It is thus also possible to control machine tools of different types by means of the control apparatus according to the invention. The apparatus may also be employed for entering and storing further or other parameters relating for instance to temperatures, pressures, time etc.

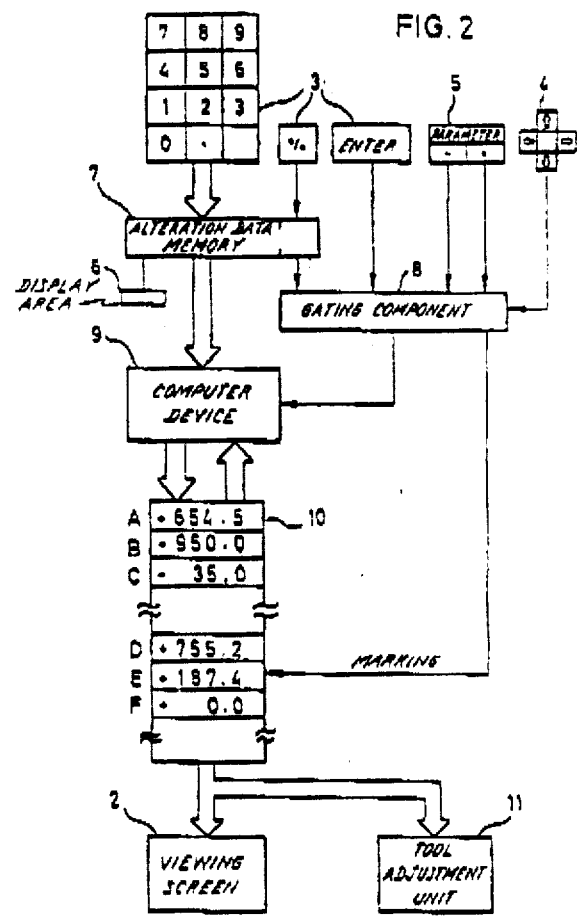

What is claimed is:

1. Apparatus for controlling the tool position of a machine tool, comprising data memory means for storing tool position data in a given sequence and tool adjustment speed data, means for entering of said tool position data and tool adjustment speed data into said data memory means, means for retrieving said data for controlling the tool movement to tool positions determined by said tool position data with adjustment speeds determined by said tool adjustment speed data, display means for the visual display of the entered position data and adjustment speed data, and means for marking selected ones of the displayed position data and adjustment speed data on said display means, and at the same time of the associated storage position in said data memory means, further comprising alteration memory means connected to said entering means for receiving alteration data for altering at least one of position data and adjustment speed data, gating means connected to said alteration memory means and to said data memory means, order entering means for selectively entering one of the orders "percental alteration", "absolute alteration" and "overwrite with altered value" into said gating means, and computer means controlled by said gating means for performing one of the operations of altering at least the marked data in the marked storage position and overwriting such marked data with the entered value, in accordance with the entered order.

2. Apparatus according to claim 1, characterized in that said order entering means comprises means for entering the sign digit of the alteration separate from the alteration magnitude.

3. Apparatus according to claim 1 or 2, characterized in that said order entering means includes means for entering an order to alter all data concerning at least one of the position and the adjustment speed, in accordance with the entered alteration.

* * * * *

UNITED STATES PATENT AND TRADEMARK OFFICE
CERTIFICATE OF CORRECTION

PATENT NO. : 4,918,612

DATED : April 17, 1990

INVENTOR(S) : Herbert Handte

Page 1 of 2

It is certified that error appears in the above-indentified patent and that said Letters Patent is hereby corrected as shown below:

In the drawings, Figure 2 should appear as shown on attached sheet.

Signed and Sealed this

Eighth Day of June, 1993

Attest:

MICHAEL K. KIRK

*Attesting Officer*  *Acting Commissioner of Patents and Trademarks*